Patented Apr. 26, 1949

2,468,172

UNITED STATES PATENT OFFICE 2,468,172

CHROMABLE AZO DYESTUFFS

Achille Conzetti and Guido Schetty, Basel, Switzerland, assignors to J. R. Geigy A.-G., Basel, Switzerland, a Swiss firm No Drawing. Application September 10, 1945, Serial No. 615,510. In Switzerland September 20, 1944

4 Claims. (Cl. 260—200)

We have found that valuable chromable azo dyestuffs are obtained by combining, in an alkaline medium, diazotized aromatic amines containing lake-forming groups with azo components of the general formula

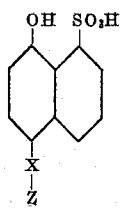

wherein X means a $SO_2$ group or a CO-group and Z means an aliphatic, aromatic or hydroaromatic radical. The resulting azo dyestuffs may be treated with chromium-yielding agents.

As aromatic amines containing lake-forming groups may be understood those compounds which contain a hydroxyl, a carboxylic acid or an alkoxy group in o-position to the amino group or which contain the salicylic acid grouping. Thus these comprise for instance o-aminophenols, o-aminonaphthols, o-aminobenzene carboxylic acids, o-aminonaphthalene carboxylic acids, o-aminoalkoxybenzenes, such as o-aminomethoxy-, -ethoxy- or -propyloxybenzenes or aminosalicylic acid compounds. The said compounds may be further substituted in any suitable manner, for example by alkyl, nitro, sulfonic acid groups or by halogen. The coupling components corresponding to the above formula are prepared according to U. S. Patent 2,359,730.

The dyestuffs of the present invention, which preferably are prepared in the presence of pyridine give on wool, when after-chromed with chromium-yielding agents, dyeings of various shades, for instance wine-red to olive-green shades of generally good fastness properties, the shades of the dyeings depending upon the diazo or azo components used. In many cases the new dyestuffs are also very suitable for use according to the one-bath chroming method. When metallised in substance they yield complex compounds which are distinguished by a good levelling power.

Of course, it is already known to make similar dyestuffs by using 1-hydroxynaphthalene-4-sulfonic acid amide -8-sulfonic acids as coupling components. When compared with these dyestuffs, the new dyestuffs obtainable according to the present method are distinguished by a deeper color in spectro and by a better shade in artificial light. In some cases they show a better fastness to light.

The following examples illustrate the present invention, without limiting the same; the parts are by weight.

Example 1

18.9 parts of 2-amino-1-hydroxybenzene-4-sulfonic acid are diazotised and the diazo solution, treated by means of sodium bicarbonate, until a slightly Congo-violet reaction is reached, is allowed to flow at 5° C. into a solution of 40 parts of 1-hydroxynaphthalene-4-(4'-methylphenyl)-sulfone-8-sulfonic acid and 15 parts of anhydrous sodium carbonate in 300 parts of water. After completion of the coupling the dyestuff is isolated by addition of sodium chloride, the precipitate being filtered off and dried. The dyestuff thus produced being a black powder dissolves in water with a violet coloration and dyes wool from an acid bath in red shades becoming Bordeaux-red and very light-fast by after-chroming the same. When using 1-hydroxynaphthalene-4-methylsulfone-8-sulfonic acid, instead of 1-hydroxynaphthalene-4-(4'-methylphenyl)-sulfone-8-sulfonic acid, there will be obtained a dyestuff being somewhat more yellowish and possessing similar properties.

Example 2

13.7 parts of 2-aminobenzoic acid are diazotised and the diazo solution allowed to run at 5–10° C. into a suspension of 28 parts of 1-hydroxynaphthalene-4-methylketone-8-sulfonic acid containing an excess of sodium carbonate. After completion of the dyestuff sodium chloride is added in order to complete the precipitation, the precipitate being filtered off. The dyestuff press-cakes are dissolved in 700 parts of hot water and boiled with a solution of ammonium-chromium-salicylate, corresponding to 9.1 parts of chromium oxide, until the formation of the complex compound is complete. It is then hot filtered in order to remove small quantities of an insoluble residue and the easily soluble dyestuff is isolated by saturating the solution with sodium chloride or by evaporation. It constitutes a brown-red powder dyeing wool from a formic acid bath in wine-red shades of good levelling properties.

By using, instead of 2-aminobenzoic acid, 4-methyl-2-aminobenzoic acid or 5-methyl-2-aminobenzoic acid similar dyestuffs are obtained.

Example 3

17.8 parts of 4:6-dichloro-2-amino-1-hydroxybenzene are diazotised in the usual manner, the diazo compound is isolated by filtration by suction, suspended in 50 parts of cold water and, while cooling with ice, stirred into a suspension of 34 parts of 1-hydroxynaphthalene-4-phenyl-ketone-8-sulfonic acid and of 12 parts of anhydrous sodium carbonate in 300 parts of water. After completition of the dyestuff, the mass is heated to 60° C. and the precipitated dyestuff is filtered off. After drying it constitutes a dark violet powder and dyes wool according to the one-bath chroming method in violet shades of very good fastness properties to milling, to potting and to light.

*Example 4*

22.4 parts of 4-chloro-2-amino-1-hydroxy-benzene-6-sulfonic acid are diazotized and the diazo compound is caused to run while cooling into a suspension of 28 parts of 1-hydroxynaphthalene-4-methylketone - 8 - sulfonic acid containing an excess of sodium carbonate. It is advantageous to add 25 parts of pyridine. After a few hours the coupling is complete. The mass is then heated to 80° C., made up to 1100 parts, treated with 110 parts of sodium chloride and the dyestuff precipitated in a crystalline form is hot filtered. The moist dyestuff is now suspended in 1200 parts of water, treated with a solution of basic chromium sulfate corresponding to 9.1 parts of chromium oxide and the whole is boiled under reflux for several hours. The complex dyestuff is isolated from the violet clear solution by precipitation with sodium chloride. After drying it forms a violet powder. The new dyestuff dyes wool from a strong sulfuric acid bath in violet shades of excellent levelling properties and of very good fastness properties in the moist state.

Instead of 1-hydroxynaphthalene-4-methyl-ketone-8-sulfonic acid, also 1-hydroxynaphthalene-4-n-propyl- or -isobutylketone-8-sulfonic acid may be used.

*Example 5*

15.4 parts of 5-nitro-2-amino-1-hydroxybenzene are diazotised and the acidity thereof is brought to Congo-violet reaction by addition of sodium bicarbonate. The diazo compound is poured into a solution of 42 parts of 1-hydroxynaphthalene-4 - (2',4'-dichlorophenyl) - ketone-8-sulfonic acid in 500 parts of water, of 15 parts of anhydrous sodium carbonate and of 30 parts of pyridine. After some hours the formation of dyestuff is completed. The mass is then heated to 70° C., the dyestuff precipitated in a beautifully crystalline form is hot filtered by suction and washed with some hot sodium chloride solution. The dyestuff, a bronzy powder, dyes wool, for instance according to the one-bath chroming method, in navy-blue shades.

*Example 6*

16.8 parts of 5-nitro-4-methyl-2-amino-1-hydroxybenzene are diazotised, the excess of acid being subsequently neutralised by means of sodium bicarbonate down to Congo-violet reaction. 45 parts of the disodium salt of 1-hydroxynaphthalene-4 - methylketone - 8 - sulfonic acid are hot dissolved in 350 parts of water, then 10 parts of anhydrous sodium carbonate and 16 parts of pyridine are added thereto and the whole is cooled to 0° C. The suspension of the diazo compound is added thereto, the mixture being cooled with ice until completion of the coupling. After heating to 70° C. and addition of 40 parts of sodium chloride the dyestuff is hot filtered, suspended in 1000 parts of water, treated at 90° C. with 240 parts of a solution of ammonium-chromium-salicylate corresponding to 9.1 parts of chromium oxide and the whole is heated to boiling. After a short time a clear blue-violet solution is formed, from which the complex dyestuff soon begins to precipitate. There it is maintained to boiling for about 17 hours, salted out, when hot, by means of 220 parts of sodium chloride, filtered and dried. Thus a dark violet powder is obtained, which dyes wool from a formic acid bath in clear reddish-blue shades of excellent levelling. The dyeings possess good fastness properties to washing, milling and to perspiration.

*Example 7*

18.9 parts of 4-chloro-5-nitro-2-amino-1-hydroxybenzene are diazotised in the usual manner and, after neutralisation of the excess of acid by means of sodium bicarbonate, the diazo compound is introduced while cooling into a suspension of 38 parts of the monosodium salt of the 1-hydroxynaphthalene-4-hexahydrophenyl-ketone-8-sulfonic acid in 300 parts of water. Then 12 parts of pyridine are added and the temperature is allowed to rise to room-temperature. After complete coupling, the mass is heated to 50° C., treated with sodium chloride until complete precipitation of the dyestuff has been reached, filtered still hot and dried. The dyestuff being a dark violet powder dyes wool from an acid bath in Bordeaux-red shades changing into beautiful blue shades when after-chromed.

*Example 8*

15.4 parts of 5-nitro-2-amino-1-hydroxybenzene are diazotised and then stirred into a suspension of 36 parts of 1-hydroxynaphthalene-4-(4'-aminophenyl)-ketone-8-sulfonic acid containing an excess of sodium carbonate. Then 25 parts of pyridine are added and the whole is stirred at 0°–5° C. until no more diazo compound can be proved. By addition of sodium chloride the precipitation of the dyestuff is completed, the latter being then filtered and dried. The new dyestuff, a dark violet powder, dyes wool from an acid bath in wine-red shades which are converted into pure grey shades of good fastness properties by an after-chromation.

*Example 9*

25 parts of the diazo compound obtainable from 1-amino-2-hydroxynaphthalene-4-sulfonic acid are added to a suspension of 32 parts of the potassium salt of the 1-hydroxynaphthalene-4-methylketone-8-sulfonic acid in 120 parts of water. Then 20 parts of caustic potash lye, corresponding to 5.6 parts of KOH, and 12 parts of pyridine are still added. The whole is stirred at room temperature, heated to 70° C. after complete coupling, neutralised by means of mineral acid and treated with sodium chloride until the dyestuff is completely precipitated. After cooling there is filtered and the crystalline moist dyestuff dissolved in 1000 parts of hot water. A solution of chromium sulfate, corresponding to 9.1 parts of chromium oxide, is then added thereto and the whole is boiled under reflux for 20 hours and allowed to cool. By addition of sodium chloride the separation of the dyestuff is completed, whereupon it is filtered and dried. The dyestuff, a dark blue powder, dyes wool from a strong sulfuric acid bath in very level, clear blue shades.

By replacing in this example the 1-hydroxynaphthalene-4-methylketone-8-sulfonic acid by the 1-hydroxynaphthalene-4-phenylketone-8-sulfonic acid a dyestuff is obtained, whose chromium complex possesses a greener shade and whose dyeings are superior to those of the above dyestuff with regard to their fastness properties to milling, perspiration and to light.

*Example 10*

23.9 parts of 1-amino-2-hydroxynaphthalene-4-sulfonic acid are diazotised and introduced into a suspension of 36 parts of 1-hydroxynaphthalene-4-(4'-aminophenyl)-ketone-8-sulfonic acid in 80 parts of water, 30 parts of caustic potash lye, corresponding to 12.5 parts of KOH, and 5 parts of pyridine. The whole is stirred at 30° C. until the diazo compound has disappeared and then neutralised by means of hydrochloric acid, whereupon the dyestuff is isolated by means of potassium chloride. The dyestuff dyes wool according to the after-chroming method in bluish-olive shades of good fastness properties.

A dyestuff having a somewhat duller and redder shade is obtained by using 1-hydroxynaphthalene-4-(3'-aminophenyl)-ketone-8-sulfonic acid instead of 1-hydroxynaphthalene-4-(4'-aminophenyl)-ketone-8-sulfonic acid.

*Example 11*

20.3 parts of 2-amino-1-methoxybenzene-4-sulfonic acid are diazotised and then coupled, in a soda-alkaline solution, with 28 parts of 1-hydroxynaphthalene-4-methylketone-8-sulfonic acid. The isolated dyestuff is dissolved in 800 parts of hot water, treated with a paste of freshly precipitated chromium hydroxide, corresponding to 10 parts of chromium oxide, and then with 25 parts of formic acid and heated in the autoclave to 130° C. for 8 hours. By addition of sodium carbonate the mixture is made slightly alkaline, the chromium residues are hot filtered off and the chromium-containing dyestuff is precipitated with sodium chloride. The new dyestuff dyes wool from a sulfonic acid bath in clear, reddish-violet shades of very good levelling properties and of a good light-fastness.

Instead of the diazo component cited in this example it is also possible to use the 2-amino-1-ethoxybenzene-4-sulfonic acid.

What we claim is:

1. The chromable azo dyestuffs of the formula

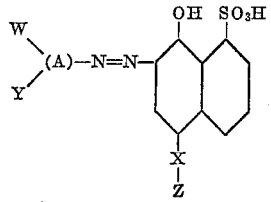

wherein A stands for a member selected from the group consisting of radicals of aromatic monoamines of the benzene and naphthalene series, W represents a member selected from the group consisting of hydroxy, alkoxy and carboxy in ortho position to the azo group, Y is a member selected from the group consisting of hydrogen, methyl, chlorine, nitro and sulfonic acid, X stands for a member selected from the group consisting of CO and $SO_2$, and Z stands for a member selected from the group consisting of alkyl and phenyl radicals, X being joined directly to a carbon atom of Z.

2. The chromable azo dyestuff of the formula

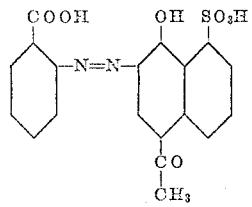

3. The chromable azo dyestuff of the formula

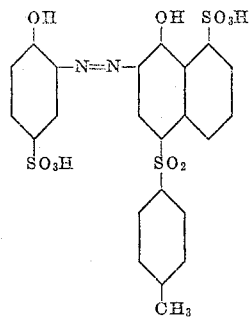

4. The chromable azo dyestuff of the formula

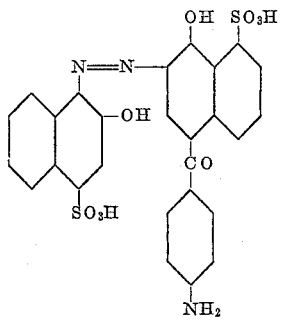

ACHILLE CONZETTI.
GUIDO SCHETTY.

REFERENCES CITED

The following references are of record in the file of this patent:

UNITED STATES PATENTS

| Number | Name | Date |
|---|---|---|
| 1,994,116 | Straub | Mar. 12, 1935 |
| 2,038,942 | Kopp | Apr. 28, 1936 |
| 2,054,057 | Lange | Sept. 8, 1936 |
| 2,268,936 | Hasler | Jan. 6, 1942 |
| 2,317,733 | Conzetti | Apr. 27, 1943 |
| 2,359,730 | Schetty | Oct. 3, 1944 |